(12) United States Patent
Farjadrad et al.

(10) Patent No.: US 7,706,434 B1
(45) Date of Patent: Apr. 27, 2010

(54) METHOD AND APPARATUS FOR CANCELLING INTERFERENCE IN A COMMUNICATION SYSTEM

(75) Inventors: Ramin Farjadrad, Mt. View, CA (US); Saman Behtash, Palo Alto, CA (US)

(73) Assignee: Aquantia Corporation, Milpitas, CA (US)

(*) Notice: Subject to any disclaimer, the term of this patent is extended or adjusted under 35 U.S.C. 154(b) by 1016 days.

(21) Appl. No.: 11/405,346

(22) Filed: Apr. 17, 2006

Related U.S. Application Data

(60) Provisional application No. 60/671,814, filed on Apr. 15, 2005.

(51) Int. Cl.
*H04B 1/38* (2006.01)
*H04L 5/16* (2006.01)

(52) U.S. Cl. .................. 375/222; 375/219; 375/316; 375/346

(58) Field of Classification Search ............... 375/222, 375/219, 316, 346
See application file for complete search history.

(56) References Cited

U.S. PATENT DOCUMENTS 5,633,863 A * 5/1997 Gysel et al. ............... 370/290
7,167,517 B2 * 1/2007 Farjad-Rad et al. ......... 375/232

OTHER PUBLICATIONS

Holte et al. (A New Digital Echo Canceller for Two-Wire Subscriber Lines; Communications, IEEE Transactions on vol. 29, Issue 11, Nov. 1981 pp. 1573-1581).*

* cited by examiner

*Primary Examiner*—Ted M Wang
(74) *Attorney, Agent, or Firm*—Sawyer Law Group, P.C.

(57) ABSTRACT

Methods and systems for cancelling interference in an analog communication signal are provided. The method includes receiving an analog communication signal including interference caused by a deterministic interference source, generating a digital interference signal corresponding to the interference caused by the deterministic interference source, converting the digital interference signal into a corresponding analog interference signal, and subtracting the analog interference signal from the analog communication signal.

18 Claims, 8 Drawing Sheets

METHOD AND APPARATUS FOR CANCELLING INTERFERENCE IN A COMMUNICATION SYSTEM

CROSS-REFERENCE TO RELATED APPLICATIONS

This application claims benefit under 35 USC 119(e) of Provisional Application No. 60/671,814, filed on Apr. 15, 2005.

FIELD OF THE INVENTION

The present invention relates generally to data communications, and more particularly to reducing interference in data communication systems.

BACKGROUND OF THE INVENTION

A communication system permits communication between two or more network devices. Communication between network devices can be conventionally achieved using a communication line (or link), formed by twisted pairs of wires (or cables), and transceivers, one transceiver positioned at each end of a twisted pair. For example, the IEEE 802.3 (10GBASE-T) standard targets data transmission rates with a total throughput of 10 Gbps over (4) pairs of twisted wires for distances of up to 100 m. The data transmission is generally performed in a simultaneous bidirectional fashion, thus each pair of wires simultaneously carries bidirectional data, each direction running effectively at 2.5 Gbps.

A common problem associated with a communication system using multiple twisted pairs of wires and multiple transceivers is noise in the form of interference signals. For example, due to the bidirectional nature of data transmission along a twisted pair (or channel), pre-echo cancellation is typically performed which subtracts a transmitted signal from a received signal. Furthermore, since channel insertion loss is quite significant, the signal strength at the end of a communication line is typically very weak, and any noise and/or interference can significantly affect communication system bit error rate (BER). Thus, much effort is usually carried out to cancel any deterministic source of noise in a communication system. Such deterministic noise sources include, for example, first reflection of a transmitted signal off of discontinuities in the communication line (so called echo), second intersymbol interference due to signal distortion in the communication line, and near-end crosstalk (NEXT) from channels adjacent to a given channel within a communication line, and differential signal wander caused by the AC coupled link and non-DC balanced data stream. Far-end crosstalk (FEXT) is another deterministic source of noise. Due to the high complexity of cancellation circuitry and the fact that far-end crosstalk is orders of magnitude weaker than other deterministic sources of noise, far-end crosstalk may not be typically cancelled. However, in the 10GBASE-T standard the very low system signal-to-noise ratio (SNR) requires FEXT cancellation as well. In the 10GBASE-T standard jitter and other alienated sources of interference are treated as random noise that are accounted for in the signal-to-noise (SNR) budget of the link.

After the cancellation of the major sources of deterministic noise, there is generally still not enough signal-to-noise ratio with +6 dB of margin left to achieve a target bit error rate of 10E-12 for the link. Therefore, a low density parity check (LDPC) decoder typically follows the recovered data to provide an additional ~9 dB gain of the signal-to-noise ratio. The overhead of the LDPC decoding is approximately 1/7th of total data throughput.

One problem of the 10GBASE-T receiver frontend is performing all the required noise cancellation functions at a reasonable power consumption. One of the major power consuming blocks, as in most digital signal processing (DSP) architectures, is the analog-to-digital converter (ADC). Considering that the received signal, has a large dynamic range—e.g., in addition to the actual signal, the received signal also carries several superimposed interference signals—the analog-to-digital converter must have a high resolution to limit the quantization noise in the cancellation and equalization processes. The analog-to-digital converter typically has a resolution of at least 10 bits per channel. The fully digital proposed architecture in the 10GBASE-T standard requires one 11 bit-12 bit analog-to-digital converter per twisted pair (with a total of four twisted pairs) running at an incoming symbol rate of at least 800 MHz. Such a high speed and high resolution analog-to-digital converter demands a very high power consumption—typically in the range of 0.5-1.0 W. Although, with circuit optimization and better process technology the power ratings for each analog-to-digital converter can be reduced to 400-800 mW, because a link typically requires four of these analog-to-digital converters, the total power of the analog-to-digital converters is approximately 2 W, which is quite considerable.

BRIEF SUMMARY OF THE INVENTION

In general, in one aspect, this specification describes a transceiver including a receiver to receive an analog communication signal including interference caused by a deterministic interference source, a digital compensation circuit to generate a digital interference signal corresponding to the interference caused by the deterministic interference source, a digital-to-analog converter (DAC) to convert the digital interference signal into a corresponding analog interference signal, a subtractor to subtract the analog interference signal from the analog communication signal, and an analog filter to filter the analog communication signal having the analog interference signal subtracted therefrom.

Implementations can include one or more of the following features. The deterministic interference source can include one or more of echo, near-end crosstalk (NEXT), or far-end crosstalk (FEXT). The digital-to-analog converter (DAC) can have at least N bits of resolution to achieve an accuracy of N bits in cancellation of the inference in the analog communication signal, where N is a positive integer. The transceiver can further include an analog-to-digital converter (ADC) to sample the filtered analog communication signal having the analog interference signal subtracted therefrom, and generate a digital communication signal having substantially no interference contained therein. The analog-to-digital converter (ADC) can comprise four interleaved analog-to-digital converters (ADCs), wherein three of the four interleaved analog-to-digital converters (ADCs) have M bits of resolution and one of the four interleaved analog-to-digital converters (ADCs) has M+k bits of resolution, where M and k are positive integer numbers. The analog filter can have a frequency response characteristic to improve the dynamic range of the received communication signal. The analog filter can be a continuous time filter or a finite impulse response (FIR) filter. The analog filter can comprise four interleaved finite impulse response (FIR) filters. The digital compensation circuit can generate a digital interference signal that corresponds only to deterministic interference substantially caused by echo.

In general, in another aspect, this specification describes a method for cancelling interference in an analog communication signal. The method includes receiving an analog communication signal including interference caused by a deterministic interference source, generating a digital interference signal corresponding to the interference caused by the deterministic interference source, converting the digital interference signal into a corresponding analog interference signal, subtracting the analog interference signal from the analog communication signal, and filtering the analog communication signal having the analog interference signal subtracted therefrom.

In general, in another aspect, this specification describes a method for cancelling interference in an analog communication signal including receiving an analog communication signal including interference caused by a deterministic interference source, the deterministic interference source including one or more of echo, near-end crosstalk (NEXT), or far-end crosstalk (FEXT); generating a digital interference signal that corresponds only to the interference substantially caused by echo; converting the digital interference signal into a corresponding analog interference signal; subtracting the analog interference signal from the analog communication signal to reduce the dynamic range of the analog communication signal; sampling the filtered analog communication signal having the analog interference signal subtracted therefrom to generate a corresponding digital communication signal; and substantially cancelling any remaining interference caused by the deterministic source from the digital communication signal in the digital domain.

The details of one or more implementations are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF THE INVENTION

The present invention relates generally to data communications, and more particularly to reducing interference in data communication systems. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
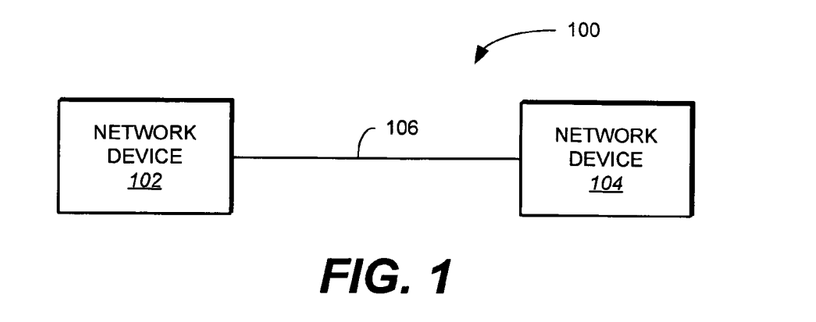
FIG. 1 is a block diagram of a communication system.

FIG. 1 shows a communication system 600 in accordance with one implementation of the invention. The communication system 100 incorporates features of the systems and methods for reducing interference signals within a received communication signal. The communication system 100 includes a network device 102 and a network device 104. The network devices 102, 104 can comprise computers, switches, routers, hubs, gateways, and similar devices. Two network devices are shown by way of example—the communication system 100 can contain a different number of network devices. The network device 102 communicates with the network device 104 through a communication line 106.

Figure 2:
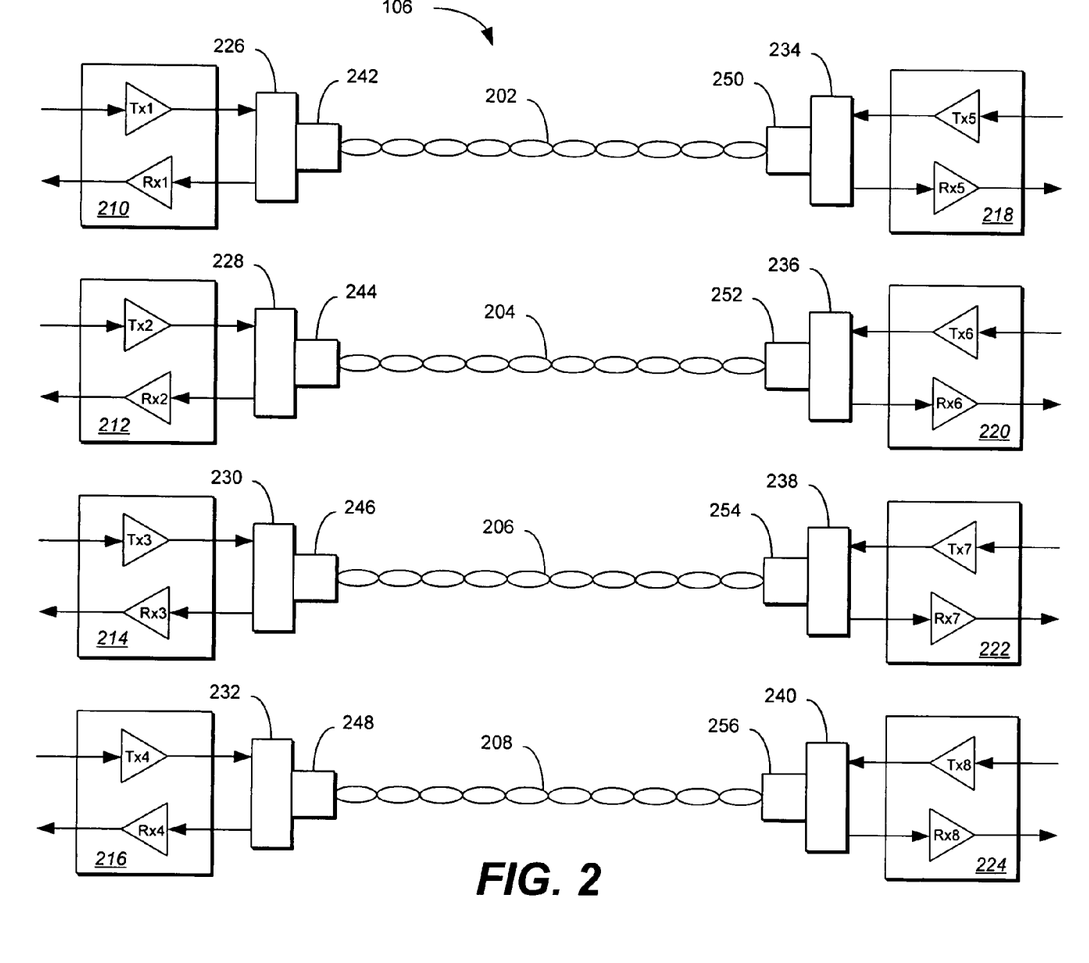
FIG. 2 is a block diagram of a plurality communication channels, each with a transceiver at each end.

Referring to FIG. 2, in one implementation, the communication line 106 includes four twisted pairs of wires 202-208 that are connected to transceivers 210-224 through corresponding connectors 242-256. In one implementation, the transceivers 210-224 are IEEE 10GBASE-T compliant. In one implementation, hybrid circuits 226-240 are used at the ends of each twisted pair of wires 202-208 to control access to a corresponding communication channel for full-duplex bidirectional operation.

Figure 3:
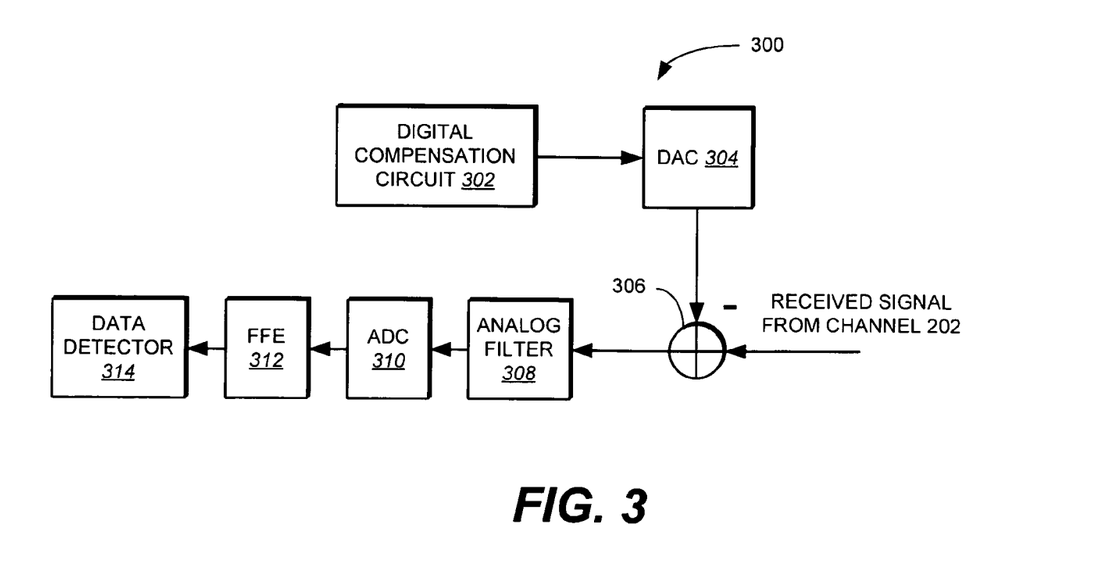
FIG. 3 is a block diagram of a transceiver architecture in accordance with one implementation.

FIG. 3 shows one implementation of a receiver architecture 300 that can be implemented within the transceiver 210. The transceivers 212-224 can include similar receiver architectures and operate in a similar manner. The receiver architecture 300 includes a digital compensation circuit 302, a digital-to-analog converter (DAC) 304, a subtractor 306, an analog filter 308, an analog-to-digital converter (ADC) 310, a feed forward equalizer (FFE) 312, and a data detector 314. In one implementation, the digital compensation circuit 302 generates a digital interference signal that corresponds to interference signals within an analog communication signal (e.g., received from transmitter Tx5) appearing at receiver Rx1. In one implementation, the digital interference signal corresponds with interference caused by deterministic interference sources (e.g., echo, near-end crosstalk, far-end crosstalk, and the like). The digital interference signal is converted to a corresponding analog interference signal by the digital-to-analog converter (DAC) 304.

The analog interference signal is subtracted from the received communication signal through the subtractor 306 to substantially remove the interference signals within the communication signal. The removal of the interference signals from the communication signal generally reduces the dynamic range of the communication signal prior to the communication signal entering the in the analog-to-digital converter (ADC) 308, thus permitting the analog-to-digital converter (ADC) 310 to operate at a lower bit resolution and thus have a lower power consumption (as compared to conventional architecture with higher resolution ADCs). In one implementation, the receiver architecture 300 further includes an analog filter (e.g., a continuous time or finite impulse response (FIR) filter) to filter the communication signal prior to the communication signal entering the in the analog-to-digital converter (ADC) 308. The analog filter 308 provides filters the communication signal to further reduce the dynamic range of the communication signal. In one implementation, the analog filter has a frequency response characteristic to improve the dynamic range of the received communication signal. Any remaining interference within the communication signal (e.g., intersymbol interference (ISI)) is cancelled by the feedforward equalizer (FFE) 312. The data detector 314 detects data from the filtered digital signal.

Figure 4:
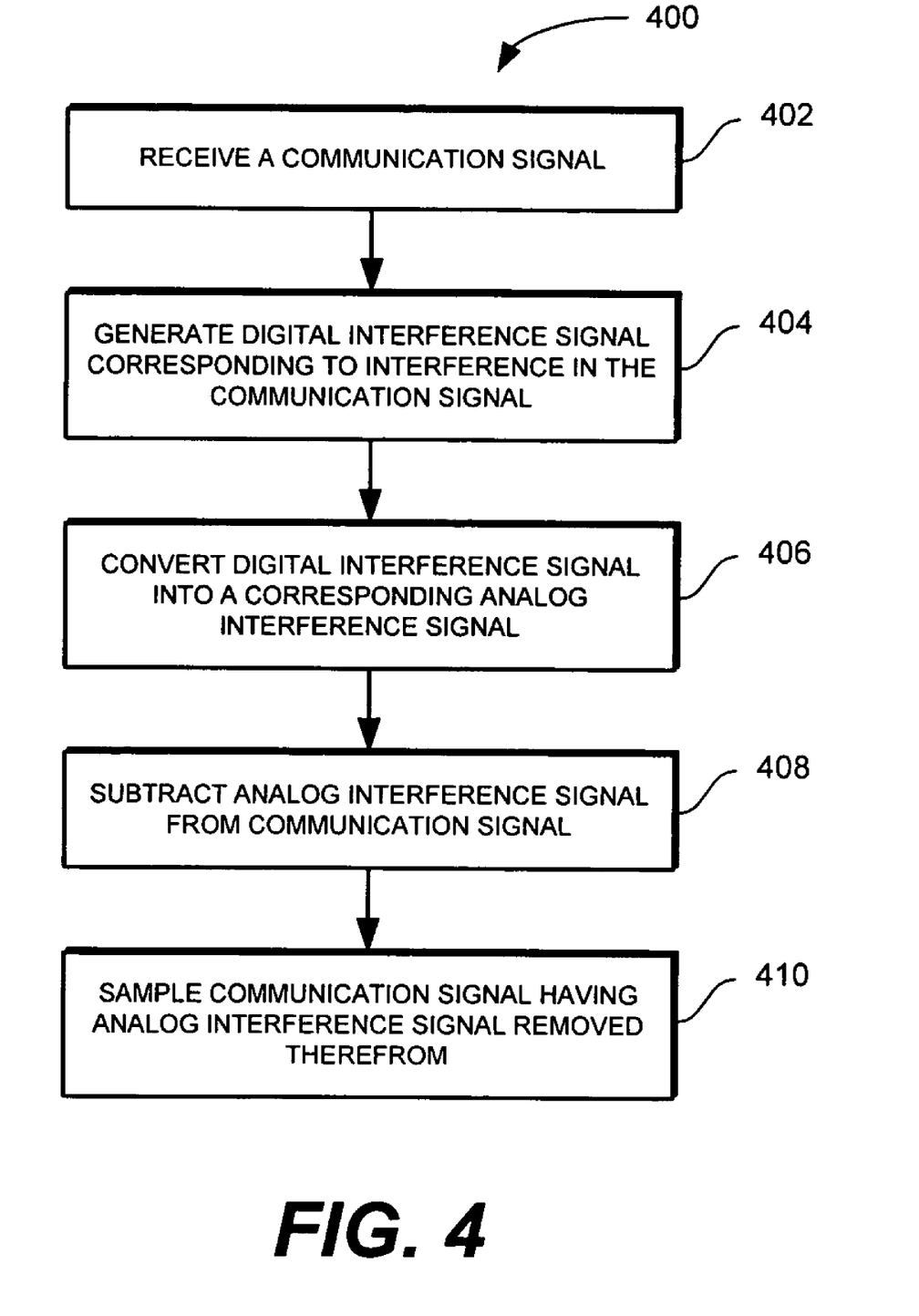
FIG. 4 illustrates a process for reducing interference signals in a communication signal.

FIG. 4 shows a method 400 for substantially removing interference signals in a received communication signal in the analog domain. A communication signal is received (e.g., by receiver Rx1) (step 402). A digital interference signal corresponding to interference in the received communication signal is generated (e.g., by digital compensation circuit 302) (step 404). In one implementation, the digital interference signal corresponds to interference caused by deterministic interference sources (e.g., echo, near-end crosstalk, far-end crosstalk, and the like). In another implementation, the digital interference signal corresponds to only interference caused by near-end crosstalk and echo to substantially reduce circuit complexity of the digital compensation circuit. The interference signal is converted into a corresponding analog interference signal (e.g., by DAC 304) (step 406). In one implementation, the interference signal is converted into a corresponding analog interference signal through a digital-to-analog converter (DAC). The analog interference signal is subtracted from the received communication signal (e.g., by substractor 306) (step 408). In one implementation, the analog interference signal is subtracted from the received communication signal to substantially remove interference caused by deterministic interference sources within the received communication signal. The communication signal having interference substantially removed therefrom is then sampled (e.g., by ADC 308) for digital processing (step 410). In one implementation, the communication signal (having interference substantially removed therefrom) is filtered through an analog filter prior to the to the communication signal entering the in the analog-to-digital converter. In one implementation, the analog filter is a high-pass filter that amplifies the high-frequency components of the signal that have been attenuated in the low-pass channel. Amplification of high-frequency signal components in the analog domain helps reduce high frequency boost of FFE in the digital domain, which in turn results in less amplification of ADC quantization noise. Thus, ADC resolution can be further reduced.

Figure 5:
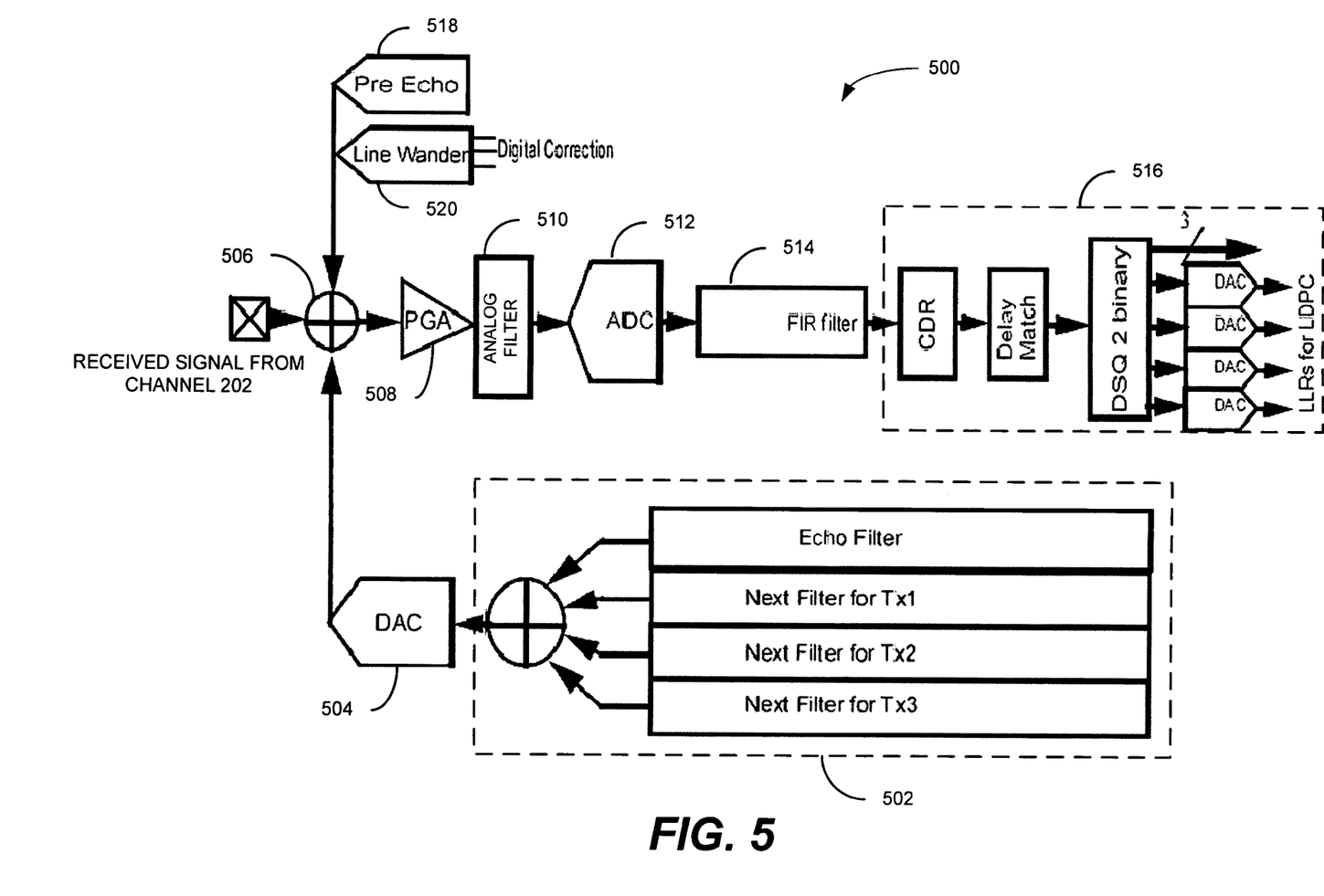
FIG. 5 is a block diagram of a transceiver in accordance with the transceiver architecture of FIG. 3.

FIG. 5 shows a block diagram of one implementation of a receiver 500 in accordance with the receiver architecture 300. The receiver 500 includes a digital compensation circuit 502, a digital-to-analog converter (DAC) 504, a subtractor 506, a programmable gain amplifier 508, an analog filter 510 (e.g., a continuous time or FIR filter), an FIR feedforward equalizer (FFE) filter 514, and a data detector 516. In one implementation, the receiver 500 further includes a conventional pre-echo canceller 518, and a line wander correction circuit 520.

The receiver 500 operates to reduce the dynamic range of the analog signal input into the analog-to-digital converter (ADC) 512. In one implementation, all deterministic interference sources are substantially cancelled from a received communication signal (e.g., received from channel 202 (FIG. 2)) in the analog domain directly before the signals enter any of the active stages (e.g., the ADC) which performances can suffer, should the received communication signal have large dynamic range. Based on the DSP simulations done over the worst case Cat6/Cat7 cables, cancellation of mainly echo as well as three NEXT interference sources and line wander, reduces the signal dynamic range by at least 10 dB (9 dB of which is due to echo). It should be noted that it is very important that the analog cancellation of echo, NEXT (and possibly FEXT) be done with high enough accuracy so that performance of the cancellation of the interference signals in the analog domain substantially matches that of a digital counterpart. Therefore, (in one implementation) to achieve an accuracy of (e.g.) 10 bits in cancellation (especially of echo), the cancellation is performed with the digital-to-analog converter (DAC) 504 having at least 10 bit accuracy. In one implementation, the cancellation is performed prior to the received signal going through any analog processing stage (e.g., the programmable gain amplifier 508).

The remaining deterministic interference on the signal is generally intersymbol interference (ISI), which is cancelled by the FIR feedforward equalizer (FFE) 514. In one implementation, the FFE 514 comprises 32-64 taps. In one implementation, a Tomlinson-Harashima precoder (THP) is implemented within the transmitter (e.g., transmitter Tx5) and, therefore, the output of the FFE 514 overflows and needs to be wrapped on itself to result in a correct signal value. As performing this wrapping function is not feasible at several hundred MHz range in the analog domain, (in one implementation) this function is inevitably implemented in digital domain where wrapping is automatically performed. However, in this implementation, an analog (continuous time or FIR) filtering technique can be implemented through the analog filter 510 to further reduce the dynamic range of the received communication signal prior to the communication signal entering the analog-to-digital converter (ADC) 512.

In one implementation, an analog implementation of low density parity check (LDPC) decoding is performed through the data detector 516, and therefore the signals within the data detector must be converted back to the analog domain (e.g., by a number of DACs). In this implementation, the resolution of the DACs within the data detector 516 can be set low (e.g., at a 5 bit resolution) as the LDPC decoder does not need high-resolution inputs. Also one of the greatest advantages of this architecture is that most of the other signal processing functions that would otherwise have to be implemented in the analog domain, can be simply implemented in the digital domain with much less implementation risk and challenge. In one implementation, these functions include the 128 DSQ-to-binary converter, the delay matching circuit, and the data interpolating clock-data recovery (CDR) circuit (within the data detector 516).

Based on the DSP analysis for 10GBASE-T communication channel and with some rough optimization for dynamic range, an analog FIR filter (e.g., analog filter 510) with 4 taps can provide up to 3 dB of improvement in dynamic range. This dynamic range is otherwise consumed by the intersymbol interference (ISI) that affects the peak-to-average ratio (PAR) of the signal. Therefore, with the 10 dB gain from direct interference cancellation (e.g., echo, NEXT, line wander), and 3 dB gain from the analog filter 510, (in one implementation) there is approximately a gain of 13 dB improvement in signal dynamic range prior to the signal entering the analog-to-digital converter (ADC) 512. In one implementation, such a significant improvement permits the resolution of the ADC 512 to be reduced by 2 bits relative to an ADC required for a conventional architecture. Such an N-bit ADC operating at an effective sampling frequency $f_s$=800 Ms/s provides a large power saving compared to a (N+2) bit ADC operating at the same conversion rate. For example, the power consumption of an 8 bit ADC is approximately 300-400 mW, while a 10 bit ADC consumes power in the range of 0.8-1.2 W. Considering that a 10GBASE-T link conventionally requires four 10 bit ADCs, the total power of implementing 8 bit ADCs within a 10GBASE-T link is approximately in the range of 1.2-1.6 W. This is a substantial reduction in power consumption compared to four 10 bit ADCs which consumes power in the range of 2.4-3.6 W.

Figure 6:
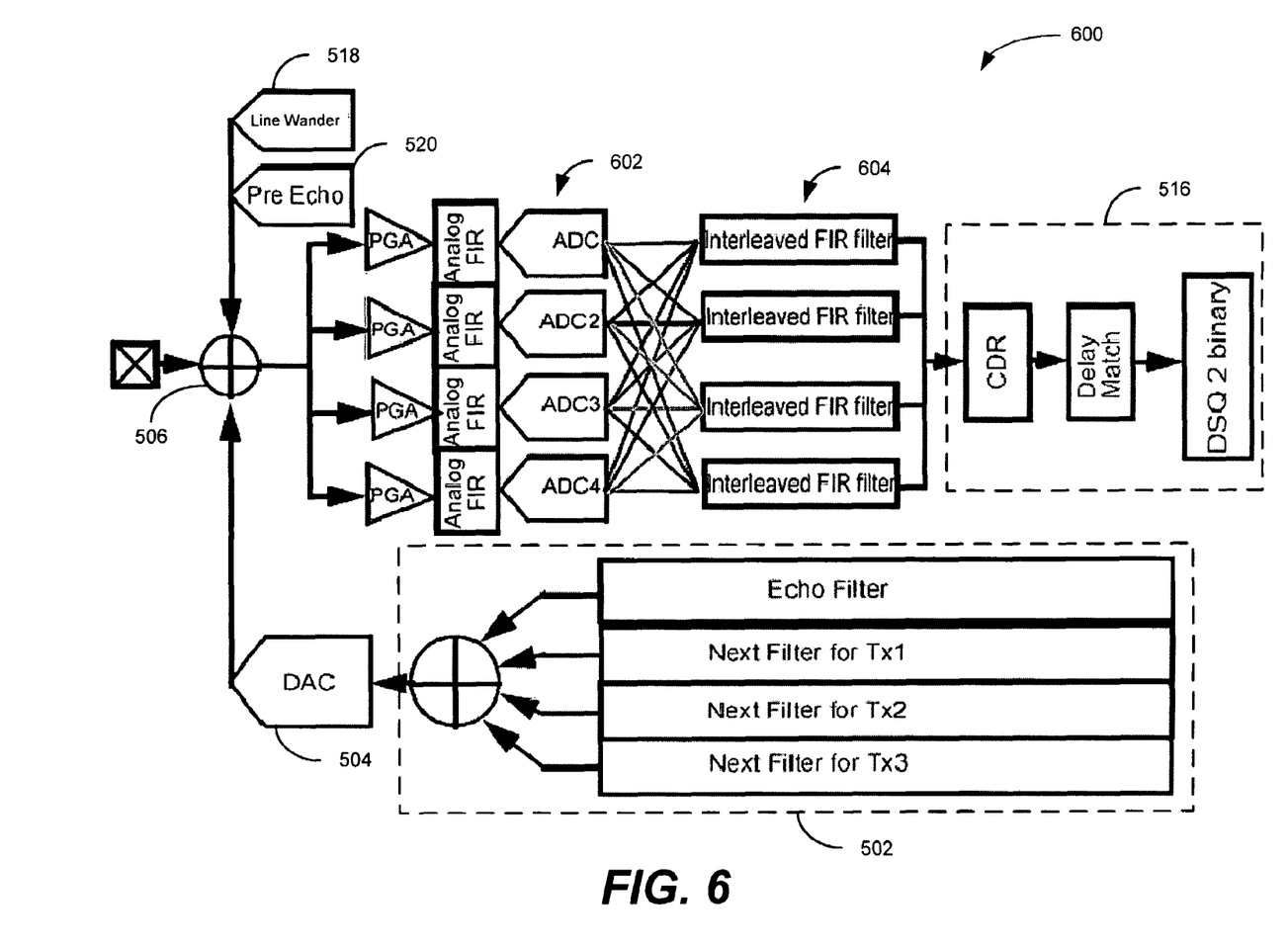
FIG. 6 is a block diagram of another transceiver in accordance with the transceiver architecture of FIG. 3.

In one implementation, to further reduce power consumption by the ADC, while maintaining the resolution and sampling rate the same, an interleaved ADC architecture 602 is implemented, as shown in the receiver 600 of FIG. 6. In one implementation, the interleaved ADC architecture 602 includes N (where N>1) parallel 8 bit ADCs each running at 1/N of the effective sampling frequency $f_s$. By running the ADCs at a lower sampling rate, power reduces at a faster rate than that of sampling rate, and thus more power is saved. For example, assuming N=4, then the interleaved ADC architecture 602 includes four ADCs each running at substantially 200 MHz. An 8 bit ADC having a 200 Mhz sampling rate consumes approximately 30 mW of power. Thus, four 8 bit ADCs (each running at an 825 Mhz sampling rate) consume approximately a total of 120 mW. Such a power consumption is a significant power advantage compared to the 300-400 mW typically consumed by a single 8 bit ADC per lane, thus, providing about 800 mW power saving over four lanes compared to conventional solutions.

In one implementation, the analog FIR filter technique as proposed in U.S. Patent Application Publication No. 20010043649 (which is incorporated by reference herein) is implemented within the interleaved architecture 602 as the analog FIR filter technique provides demuxed equalized signals at each phase of the clock, and thus for each interleaved ADC sampling at that phase of clock. It should be noted that the number of taps for this analog FIR filter is limited to the number of clock phases and thus the interleaved stages. One can perform tap weight rotation to obtain more filter taps than the number of interleaved stages, and such a trade off of the extra complexity of this approach versus the filter gain for more taps can be considered based on particular application requirements. One implementation of the architecture of this approach is also shown in FIG. 6, where a four interleaved FIR filters 604 are implemented with each ADC running off of one of equi-distance phases of a 200 MHz clock. Note that the programmable gain amplifier (PGA) can be shared among all ADC, or there can be one PGA per stage. In one implementation, the PGA also serve effectively as the sample-and-hold (S/H) buffers preceding the FIR tap stages. This has the benefit of removing an extra analog buffering stage that affects the nonlinearity of the analog receive path.

One important factor to be considered in the interleaved architectures shown in FIG. 6 is the mismatch among the paths that can affect the overall performance of data conversion in an interleaved architecture. The mismatch sources include the accuracy of the clock phase spacing, input referred offset difference between each branch, and the gain mismatch between each branch. In one implementation, these mismatch sources are either minimized or cancelled during chip startup.

It should be noted that (in one implementation) at least one of the N lower resolution ADCs, may have a higher resolution mode (e.g., 2 more bits, as shown in FIG. 6), so that the adaptation measurements for different filter tap settings and other adjustments can be performed in a reasonable time and without an error floor caused by quantization noise associated with the ADCs. In one implementation, the additional resolution bits are further added to potentially reduce the adaptation time.

In one implementation, this same high-resolution ADC is used as a reference to cancel mismatches among the other N−1 branches by adjusting their gain to that of a more accurate ADC. This calibration includes calibrating each tap of the analog FIR together with its dedicated PGA (while other taps are off) together with branch ADC for its gain and offset. In one implementation, this is attained by fine tuning the analog FIR stage/PGA, and not the ADC. This approach permits direct use of off-the-shelf ADCs without requiring any modifications to such ADCs. In one implementation, to calibrate for offset, the analog FIR is disconnected from the line and its inputs are shorted together, and the adjustment on the FIR tap stage/PGA is done such that the reading of the ADC is zero.

In one implementation, for gain adjustment, a certain voltage in the range of the input full scale voltage is applied to each branch input after the analog FIR is disconnected from the line. In one implementation, the same exact voltage is applied to all branches and not a replica of the reference voltage to avoid any possible mismatch. In one implementation, the reading on the high-resolution ADC is first recorded, and then the reading on the other ADCs is forced to be the same by adjusting the gain in each FIR tap stage/PGA.

Figure 7:
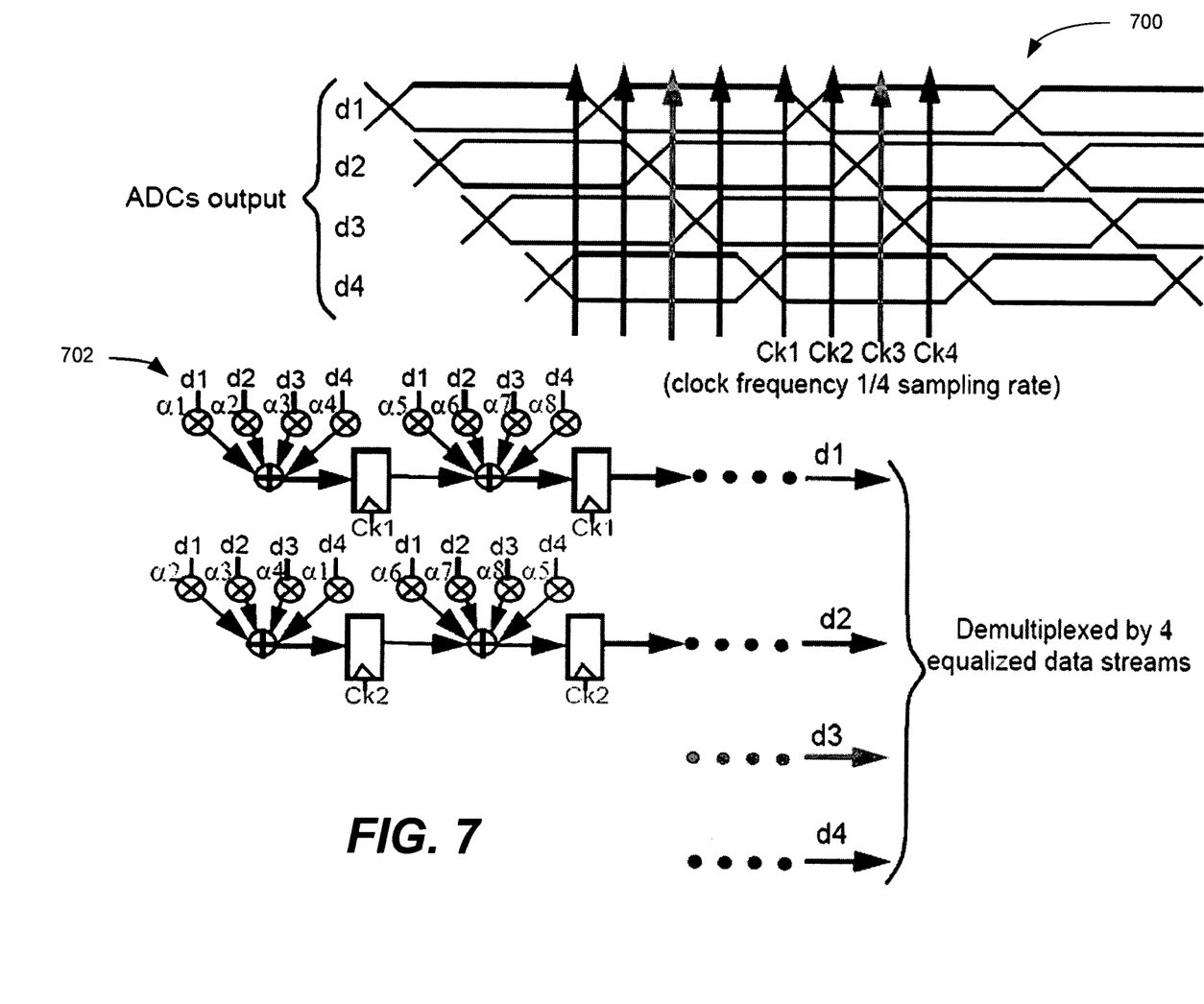
FIG. 7 is a block diagram of a digital FIR filter.

FIG. 7 shows a digital interleaved FIR filter architecture 700 in accordance with one implementation. In one implementation, the digital interleaved FIR filter architecture 700 is compatible with the interleaved ADC architecture 602 (FIG. 6). In one implementation, the digital interleaved FIR filter architecture 700 takes advantage of delays already available by the interleaved approach. As shown in FIG. 7, each stage 702 performs N multiplications at a time, along with one addition and one delay. Although (in one implementation) the summing function is more complex (as the summing function has to add N numbers at a time) this summation function is done at 1/N of the full clock rate. Also, in one implementation, the number of flip flops for delaying the results of the FIR implementation is reduced by a factor of four. Accordingly, the output of the interleaved FIR architecture looks like a demultiplexed data stream, and thus reduces the amount of demultiplexing in the frontend that is required by for an LDPC decoder.

Figure 10:
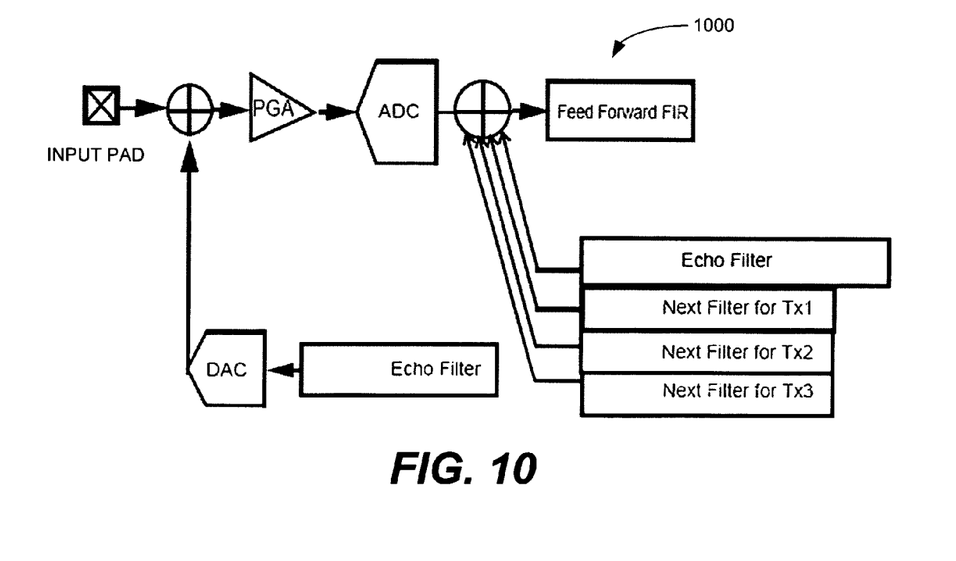
FIG. 10 is a block diagram of another transceiver architecture in accordance with one implementation.

FIG. 10 shows a block diagram of one implementation of a receiver 1000 in accordance with one implementation. In general, analysis on the nature of interference sources in 10GBASE-T applications reveals that echo interference from the first 10-15 m of cable is the dominant source of interference, which constructs a considerable portion of the received signal power and significantly affects the peak-to-average ratio (PAR) of the signal at the input of the ADC. Thus, by cancelling this portion of echo, considerable reduction of PAR can be achieved, thus reducing the required dynamic range of the ADC. As a result one can achieve the goal of reducing the effective bit resolution of ADC by using only a partial FIR filter before ADC, and perform the rest of cancellation function more accurately in digital domain. Accordingly, in the receiver 1000, (in one implementation) only 100 taps of echo is cancelled in the analog domain, and a full cancellation of echo, NEXT (and in some implementations FEXT) is performed in the digital domain. For example, as shown in FIG. 10, in the digital domain a 1000 tap filter can be used to cancel echo, and a 100 tap filter can be used to cancel NEXT associated with NEXT. Note that as a result of reducing the amount of interference in a received communication signal, the tap resolution for mixed-mode cancellation filters will be lower than a counterpart architecture with all taps cancelled in the analog domain or all taps cancelled in the digital domain. Therefore, the power difference of the implementation shown in FIG. 10 will be less than the total power associated with the additional 100 tap echo filter. It should also be noted that in the mixed mode interference cancellation as described above, the analog cancellation will not always be limited to echo, and can be applied to any source of deterministic interference with a magnitude on the same order of the total received signal.

Digital Calibration of Analog Frontend Non-Linearity and Mismatch

In applications where signals need to be processed with high accuracy, and with the signals having to go through multiple analog stages, the non-idealities of the analog stages (e.g., input offset and non-linearity) degrade the overall performance. In some implementations, the non-idealities of these analog stages must be minimized to meet the required application requirements. For example, one way to reduce the signal offset as a result of device mismatches in a differential pair is to increase the device sizes, but that directly results in a larger area and also higher circuit power to drive the larger devices. As for the linearity in a differential pair, an option is to increase the dynamic range of the stage by increasing the stage current or reducing gain using emitter/source degeneration. While the latter may not directly increase the power, the loss of gain that must be compensated by same or another stage will clearly require additional power.

Figure 8:
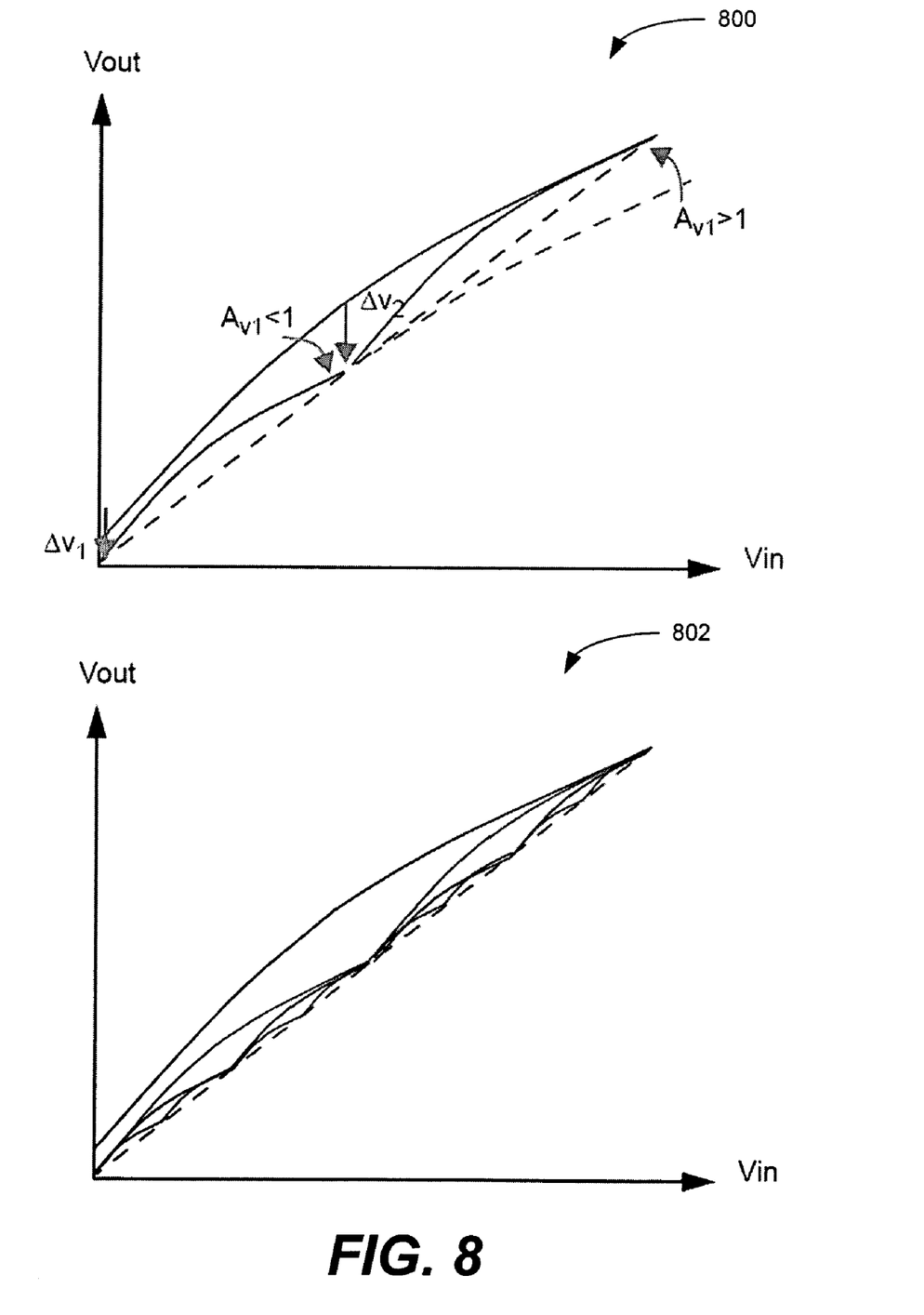
FIG. 8 shows example transfer curves.

Although there are several methods existing for offset cancellation of the analog stages, the conventional methods do not address the non-linearity degradation problem nor gain error. The proposed technique is flexible enough to digitally provide for correction of non-idealities in accordance with the input-output transfer function. The basic idea is shown in the graph 800 of FIG. 8 for only one level of correction. The transfer curve shown in the graph 800 is divided into two sections, and the beginning and end points of each section is ensured to be equal to that of an ideal transfer curve. In one implementation, the beginning point is forced to the ideal line by applying a fixed voltage offset to the section, and the end point is forced to the ideal line by applying a fixed gain to the section. This process can be performed for as many subsections as needed to achieve a given target specification for the analog stages. The graph 802 of FIG. 8 shows the end result of performing such a digital correction process for three levels of correction. In this specific example, it can be seen that for each level of correction, the transfer non-linearity is reduced by about a factor of two, with the third level correction achieving an integral non-linearity (INL) that is about an order of magnitude less than the original transfer curve.

Figure 9:
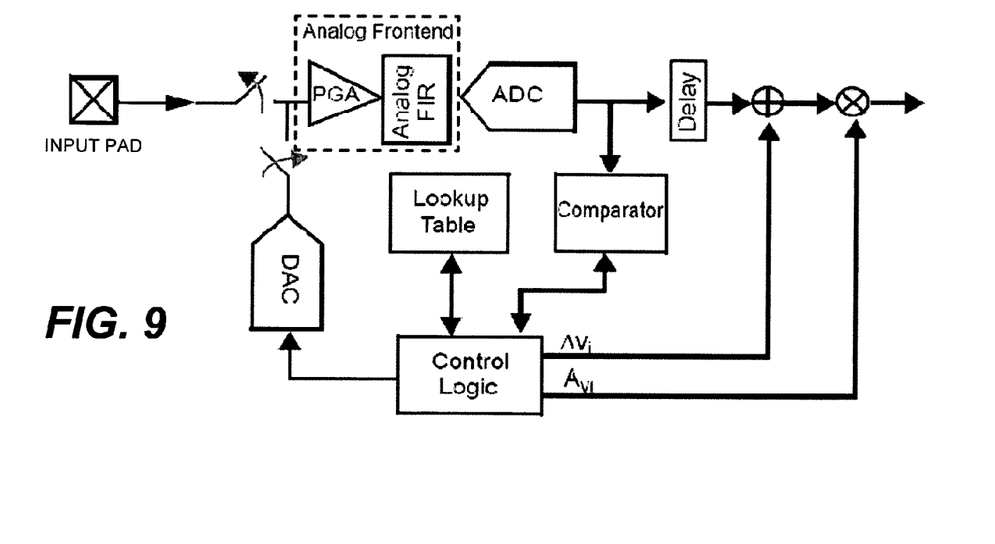
FIG. 9 is a block diagram of another transceiver architecture in accordance with one implementation.

FIG. 9 shows one implementation of the digital correction technique. According to the implementation shown, during the calibration process at circuit startup, the analog frontend is disconnected from the input and connected to a DAC which provides an accurate input voltage sweep for calibration purpose. In one implementation, the analog frontend of the receiver includes components of a receiver prior to (and including) the analog-to-digital converter (ADC). For example, in one implementation, the analog frontend includes one or more programmable gain amplifiers, one or more analog filters and/or one or more analog-to-digital converters (ADCs). In one implementation, the DAC bit resolution is equal to the number of digital correction levels required. Note, however, that only in the case of INL correction the DAC must maintain an accuracy better than a target accuracy required for signal processing, as that is being used as the reference for correction. For offset and gain mismatch correction, an accurate DAC is not needed. For each level of the DAC input voltage, a comparator compares the ADC output to that of an expected ideal output and reports the difference to the control logic. Thus, as explained above, for each section of the curve, the section start point value is compared to the ideal value and the difference is corrected by a voltage offset correction $\Delta v_i$ and the end point value difference is corrected by a gain adjustment $A_{vi}$. In one implementation, the offset and gain associated with each section is stored in a lookup table.

During normal operation, the DAC is disconnected from the input and analog frontend is connected to the input pads. In this mode, for each digitized ADC output, the comparators reports to the control logic which section the input signal falls into and the control logic applies the associated voltage offset and gain to that section as shown FIG. 9 by the digital adder and multiplier. Note that, in one implementation, first the DC offset correction is applied and then the gain correction is applied. The data from the ADC goes through appropriate delay stages to provide enough timing for the comparator and control logic to find $\Delta v_i$ and $A_{vi}$ for given digitized ADC output.

Note that as high correction levels are used, while the logic power stays the same, such use enables significant reduction of power in the analog frontend stages for the target voltage offset, gain, and INL. For example, as discussed above, three levels of correction substantially provides an order of magnitude improvement in INL that would otherwise have required much higher current to be consumed in each analog stage. Thus, in one implementation, higher correction levels are recommended. In the specific example of the proposed 10GE frontend architecture, to avoid adding another switch in the path of the signal, in one implementation, the same sampling switch of the frontend sample/hold is used for this purpose, along with the addition of more control logic to control the turning on and off of the switch and the sampling. This effectively keeps only one switch in the frontend path, and prevents the input signal from degrading due to extra switch gates in the path.

Various implementations have been described. Nevertheless, various modifications may be made to the implementations, and those modifications would be within the scope of the present invention. For example, though examples described above generally described in the context of the IEEE 802.3 standard, the implementations above generally described in the context of the IEEE 802.3 standard, the implementations described above may be applicable to other IEEE standards. Also, an analog filter can be added when analog echo cancellation is performed past the analog filter. Accordingly, many modifications may be made without departing from the scope of the present invention.

The invention claimed is:

1. A transceiver comprising:
    a receiver to receive an analog communication signal including interference caused by a deterministic interference source;
    a digital compensation circuit to generate a digital interference signal corresponding to the interference caused by the deterministic interference source;
    a digital-to-analog converter (DAC) to convert the digital interference signal into a corresponding analog interference signal;
    a subtractor to subtract the analog interference signal from the analog communication signal;
    an analog filter to filter the analog communication signal having the analog interference signal subtracted therefrom; and
    an analog-to-digital converter (ADC) to sample the filtered analog communication signal having the analog interference signal subtracted therefrom, and generate a digital communication signal having substantially no interference contained therein,
    wherein the analog-to-digital converter comprises n interleaved analog-to-digital converters (ADCs), wherein at least one of the n interleaved analog-to-digital converters (ADCs) has M+k bits of resolution and the other ones of the n interleaved analog-to-digital converters (ADCs) have M bits of resolution, where n, M and k are positive integer numbers.

2. The transceiver of claim 1, wherein the deterministic interference source comprises one or more of echo, near-end crosstalk (NEXT), or far-end crosstalk (FEXT).

3. The transceiver of claim 1, wherein the digital-to-analog converter (DAC) has at least N bits of resolution to achieve an accuracy of N bits in cancellation of the inference in the analog communication signal, where N is a positive integer.

4. The transceiver of claim 1, wherein the analog filter has a frequency response characteristic to improve the dynamic range of the received communication signal.

5. The transceiver of claim 1, wherein the analog filter is a continuous time filter or a finite impulse response (FIR) filter.

6. The transceiver of claim 1, wherein the analog filter comprises four interleaved finite impulse response (FIR) filters.

7. The transceiver of claim 1, wherein the digital compensation circuit generates a digital interference signal that corresponds only to deterministic interference substantially caused by echo.

8. A method for cancelling interference in an analog communication signal, the method comprising:
receiving an analog communication signal including interference caused by a deterministic interference source;
generating a digital interference signal corresponding to the interference caused by the deterministic interference source;
converting the digital interference signal into a corresponding analog interference signal;
subtracting the analog interference signal from the analog communication signal; and
filtering the analog communication signal having the analog interference signal subtracted therefrom;
sampling through an analog-to-digital converter (ADC) the filtered analog communication signal having the analog interference signal subtracted therefrom; and
generating a digital communication signal having substantially no interference contained therein,
wherein the analog-to-digital converter (ADC) comprises n interleaved analog-to-digital converters (ADCs), wherein at least one of the n interleaved analog-to-digital converters (ADCs) has M+k bits of resolution and the other ones of the n interleaved analog-to-digital converters (ADCs) have M bits resolution, where n, M and k are positive integer numbers.

9. The method of claim 8, wherein the deterministic interference source comprises one or more of echo, near-end crosstalk (NEXT), or far-end crosstalk (FEXT).

10. The method of claim 8, wherein converting the digital interference signal into a corresponding analog interference signal (DAC) is performed through a digital-to-analog converter (DAC) having at least N bits of resolution to achieve an accuracy of N bits in cancellation of the inference in the analog communication signal, where N is a positive integer.

11. The method of claim 8, wherein filtering the analog communication signal is performed through an analog filter that is a continuous-time filter or a finite impulse response (FIR) filter.

12. The method of claim 11, wherein the analog communication is received through a receiver, and the method further comprises digitally calibrating an output of an analog frontend of the receiver including performing voltage offset correction or gain adjustment of the output of the analog frontend to achieve a pre-determined target specification for the analog frontend.

13. The method of claim 12, wherein digitally calibrating an analog frontend of the receiver includes comparing an output of the analog-to-digital converter (ADC) to that of a pre-determined reference source and reporting a difference between the output of the analog-to-digital converter (ADC) and the pre-determined reference source to control logic for performing the voltage offset correction or the gain adjustment of the analog frontend.

14. The method of claim 12, wherein the analog front end of the receiver comprises a programmable gain amplifier.

15. The method of claim 11, wherein the analog filter has a frequency response characteristic to improve the dynamic range of the received communication signal.

16. The method of claim 11, wherein the analog filter comprises four interleaved finite impulse response (FIR) filters.

17. The method of claim 8, wherein generating a digital interference signal corresponding to the interference caused by the deterministic interference source includes generating a digital interference signal that corresponds only to deterministic interferences substantially having a magnitude of the same order of the total received analog communication signal.

18. A method for cancelling interference in an analog communication signal, the method comprising:
receiving an analog communication signal including interference caused by a deterministic interference source, the deterministic interference source including one or more of echo, near-end crosstalk (NEXT), or far-end crosstalk (FEXT);
generating a digital interference signal that corresponds only to the interference substantially caused by deterministic interferences each having a magnitude of the same order of the total received analog communication signal;
converting the digital interference signal into a corresponding analog interference signal;
subtracting the analog interference signal from the analog communication signal to reduce the dynamic range of the analog communication signal;
sampling through an analog-to-digital converter (ADC) the analog communication signal having the analog interference signal subtracted therefrom to generate a corresponding digital communication signal having substantially no interference contained therein, wherein the analog-to-digital converter (ADC) comprises n interleaved analog-to-digital converters (ADCs), wherein at least one of the n interleaved analog-to-digital converters (ADCs) has M+k bits of resolution and the other ones of the n interleaved analog-to-digital converters (ADCs) have M bits resolution, where n, M and k are positive integer numbers; and
substantially cancelling any remaining interference caused by the deterministic source from the digital communication signal in the digital domain.

* * * * *